United States Patent Office 2,990,395
Patented June 27, 1961

2,990,395
POLYETHER COMPOSITIONS
Francis George Jeffers, Manchester, England, assignor to Imperial Chemical Industries Limited, London, England, a corporation of Great Britain
No Drawing. Filed Aug. 12, 1959, Ser. No. 833,162
Claims priority, application Great Britain Aug. 21, 1958
11 Claims. (Cl. 260—45.75)

This invention relates to improved polyether compositions, and more particularly to polyether compositions which are stabilized against oxidation.

It is known to stabilize materials which are subject to deterioration in the presence of oxygen by incorporating therein a variety of materials, including phenolic materials. The efficiency of such added materials varies considerably with the nature and structure of the material to be stabilized and of the material added as stabilizer, and is not readily predicted.

Polyethers are liable to deteriorate on exposure to oxygen, this deterioration resulting in discoloration and eventually to oxidative breakdown of the polyethers.

It has now been found that the phenolic compounds which are the subject of specification No. 723,838 and U.S. Patent No. 2,900,902 are valuable for the stabilization of polyethers against oxidation.

Thus, according to the present invention there is provided a process for the stabilization of polyethers against oxidation which comprises incorporating therein as antioxidant a 2-α-alkylcycloalkyl-4:6-dimethylphenol or a bis-(2-hydroxy-3-α-alkylcycloalkyl-5-methylphenyl)-methane wherein the alkyl group has not more than 4 carbon atoms and the cycloalkyl group is cyclopentyl, methylcyclopentyl, cyclohexyl or methylcyclohexyl.

The antioxidants may be made in the manner more fully described in specification No. 723,838 and U.S. Patent No. 2,900,902 and the antioxidants which may be used include 2-α-methylcyclohexyl-4:6-dimethylphenol, 2-α-ethylcyclohexyl-4:6-dimethylphenol, 2-α-n-butylcyclohexyl-4:6-dimethylphenol, 2-α-γ-dimethylcyclohexyl-4:6-dimethylphenol, 2-α-methylcyclopentyl-4:6-dimethylphenol, bis-(2-hydroxy-3-α-methylcyclohexyl-5-methylphenyl)methane, bis-(2-hydroxy-3-α-methylcyclopentyl-5-methylphenyl)methane, bis-(2-hydroxy-3-α-δ-dimethylcyclohexyl-5-methylphenyl)methane, bis-(2-hydroxy-3-α-ethylcyclohexyl-5-methylphenyl)methane, bis-(2-hydroxy-3-α-n-butylcyclohexyl-5-methylphenyl)methane, 2:2'-dihydroxy-3-α-methylcyclopentyl-3'-α-methylcyclohexyl-5:5'-dimethyldiphenylmethane and mixtures thereof. The phenolic antioxidants may be used as such or in the form of their salts, for example their normal or basic aluminum, barium, calcium, magnesium or zinc salts.

Polyethers which may be stabilized by the process of the present invention include hydroxyl-ended polymers or copolymers of cyclic ethers and especially of ethylene oxide, propylene oxide, epichlorhydrin, oxacyclobutane and substituted oxacyclobutane and tetrahydrofuran. Such polyethers or copolyethers are conveniently prepared for example by methods described in U.S. Patent No. 2,952,651, or by the well known methods of polymerizing, copolymerizing and condensing for example ethylene oxide, propylene oxide or mixtures thereof by use of catalysts, particularly alkaline catalysts (see for example the 1952 edition of "Glycols," edited by Curme & Johnston and published by Reinhold Publishing Corporation, at pages 176–193 and 277–280). Small proportions (less than 5% molar) of polyfunctional reagents may also be copolymerized with the ether, for example glycidol, glycerol, trimethylolpropane and 3-hydroxymethyloxacyclobutanes.

The proportion of the antioxidant to be used may be up to 5%, and preferably between 0.1% and 2.0% by weight of the polyether. The antioxidant may be incorporated in the polyether at any convenient stage in manufacture, and usually it is most convenient to incorporate it in the polyether shortly after the polyether has been made. If desired, however, the antioxidant may be incorporated by inclusion in the reaction mixture in which the polyether is formed, especially in those instances in which the polyether is particularly susceptible to the action of oxygen, as for example in the case of polymers derived from tetrahydrofuran. A convenient method which may be adopted is to add the antioxidant to the material to be polymerized, for example to the tetrahydrofuran, propylene oxide or ethylene oxide employed.

By the process of the present invention, polyethers may be stabilized against oxidation without the production of undesirable discoloration of the polyether on storage and without adversely affecting the reactivity and usefulness of the polyethers for subsequent processes, including reaction with organic polyisocyanates for the production of polyurethane compositions.

The invention is illustrated but not limited by the following examples in which the parts and percentages are by weight.

*Example 1*

A mixture of 100 parts of pure tetrahydrofuran and 0.07 part of bis-(2-hydroxy-3-α-methylcyclohexyl-5-methylphenyl)-methane are stirred at 10–15° C. in an enclosed glass apparatus protected against the entry of atmospheric water vapour and 7 parts of distilled fluorosulphonic acid are added during a period of 15–20 minutes while the temperature of the mixture is allowed to rise to 20° C. Stirring is continued at 19–21° C. for 40 hours and then 1000 parts of water are added and the mixture is boiled for 1 hour to remove unchanged tetrahydrofuran. The aqueous phase of the resulting mixture is removed, and the remaining oily organic phase is repeatedly washed with boiling water until neutral, and finally is dried by heating under a pressure 20–25 mm. of mercury at a temperature which is raised from 40° to 100 C. during about 1 hour. The product comprises approximately 70 parts of oily polymer, and solidifies to a waxy solid on standing at room temperature. Spectroscopic examination of the product shows no infra-red absorption in the 5.75 $\mu$ region, so indicating the absence of oxidation products, whereas similar examination of a polymer prepared in an identical manner except that the antioxidant is omitted shows considerable infra-red absorption at 5.75 $\mu$.

*Example 2*

The procedure of Example 1 is repeated except that 0.07 part of 2-α-methylcyclohexyl-4:6-dimethylphenol is used in place of the 0.07 part of bis-(2-hydroxy-3-α-methylcyclohexyl-5-methylphenyl)methane.

The yield of product is 70 parts and spectroscopic examination of the product shows no infra-red absorption band in the 5.75 $\mu$ region, so indicating absence of oxidation products in the polymer.

*Example 3*

A polypropylene glycol of molecular weight approximately 2400 prepared by addition of propylene oxide to diethylene glycol in the presence of an alkali catalyst, was tested for oxygen absorption at 100° C. Oxygen was absorbed immediately and at a rate of 15.6 millilitres per hour per 10 gram sample.

A further sample of the same material to which 0.1% of bis-(2-hydroxy-3-α-methylcyclohexyl-5-methylphenyl)-methane had been added was similarly tested, and it was found that the oxygen absorption was completely suppressed for a period of 5 hours, and thereafter only proceeded at about one tenth of the previous rate, namely approximately 1.5 millilitres per hour per 10 gram sample.

The oxygen absorption is measured by absorption of the polymer onto sufficient unglazed earthernware beads in a flask so that, even on prolonged standing, no liquid polymer collects in the bottom of the flask.

The flask is connected to a Lunge nitrometer and heated in a constant-level boiling water bath, evacuated, and then both flask and nitrometer are filled at atmospheric pressure with oxygen. The volume of oxygen absorbed is then noted from time to time, while keeping the polyether temperature constant at 100° C.

What I claim is:

1. A process for the stabilization of polyethers against oxidation which comprises incorporating therein as antioxidant a compound selected from the group consisting of 2 - α -alkylcycloalkyl-4:6-dimethylphenol and bis-(2-hydroxy - 3 - α-alkylcycloalkyl-5-methylphenyl)methane, wherein the alkyl group has not more than 4 carbon atoms and the cyclo alkyl group is selected from the group consisting of cyclopentyl, methylcyclopentyl, cyclohexyl and methylcyclohexyl.

2. A process for the stabilization of polyethers as claimed in claim 1 wherein the antioxidant is used in the form of its salt.

3. A process for the stabilization of polyethers as claimed in claim 2 wherein the salt is selected from the group consisting of normal and basic aluminum, barium, calcium, magnesium and zinc salts.

4. A process for the stabilization of polyethers as claimed in claim 1 wherein the polyethers are selected from the group consisting of hydroxyl-ended polymers and copolymers of cyclic ethers.

5. A process for the stabilization of polyethers as set forth in claim 1 in which the proportion of antioxidant is up to 5% by weight of the polyether.

6. A process for the stabilization of polyethers as set forth in claim 5 in which the proportion of antioxidant is between 0.1% and 2% by weight of the polyether.

7. A process for the stabilization of polyethers as claimed in claim 1 in which the antioxidant is incorporated in the polyether shortly after the polyether has been made.

8. A process for the stabilization of polyethers as claimed in claim 1 wherein the antioxidant is incorporated by inclusion in the reaction mixture in which the polyether is formed.

9. A process for the stabilization of polyethers as claimed in claim 8 wherein the polyethers are derived from tetrahydrofuran.

10. A process for the stabilization of polyethers as claimed in claim 8 in which the antioxidant is added to the material to be polymerized.

11. A process as set forth in claim 10 in which the material to be polymerized is selected from the group consisting of tetrahydrofuran, propylene oxide and ethylene oxide.

References Cited in the file of this patent

UNITED STATES PATENTS

| | | |
|---|---|---|
| 2,734,924 | Lambert | Feb. 14, 1956 |
| 2,748,096 | Lambert et al. | May 29, 1956 |
| 2,903,493 | Lambert | Sept. 8, 1959 |
| 2,915,496 | Swart et al. | Dec. 1, 1959 |